W. VAN ANDEN.
VEHICLE SPRING.
No. 10,540. Reissued Dec. 2, 1884.
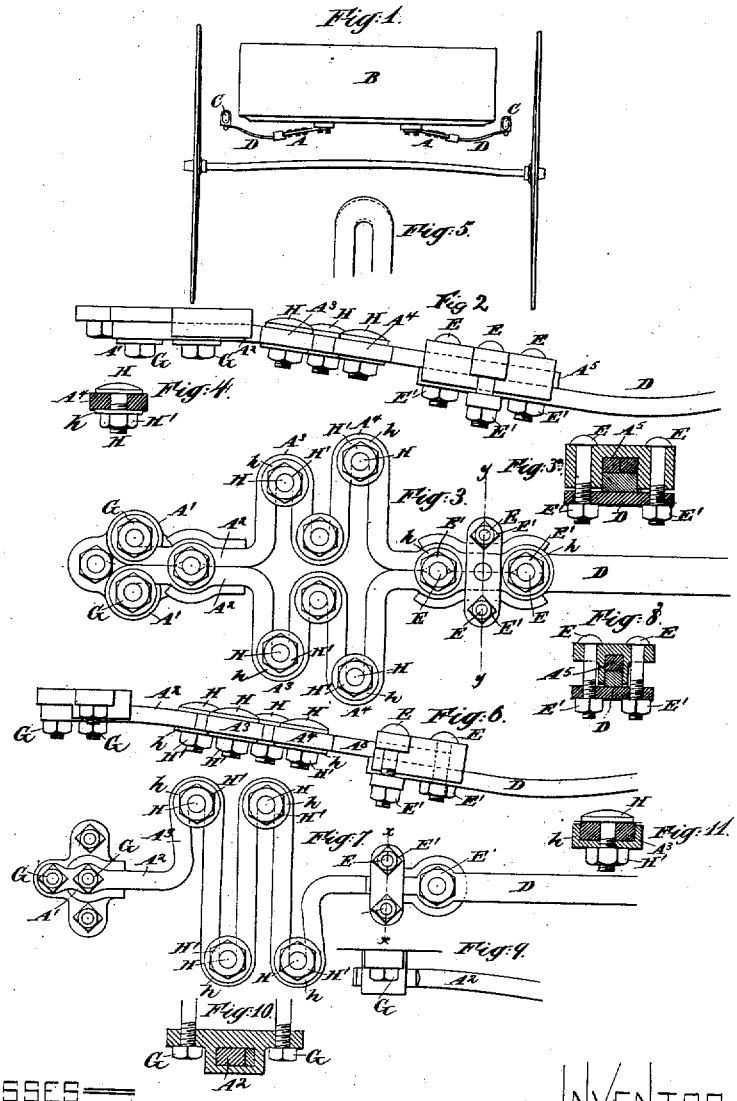
WITNESSES—
Charles R. Searle.
J. E. Renwick
INVENTOR—
William Van Anden
by his Attorney
Thomas D. Stetson
N. PETERS, Photo-Lithographer, Washington, D. C.

UNITED STATES PATENT OFFICE.

WILLIAM VAN ANDEN, OF NEW YORK, N. Y.

VEHICLE-SPRING.

SPECIFICATION forming part of Reissued Letters Patent No. 10,540, dated December 2, 1884.

Original No. 293,824, dated February 19, 1884. Application for reissue filed July 8, 1884.

*To all whom it may concern:*

Be it known that I, WILLIAM VAN ANDEN, of New York city, in the State of New York, have invented certain new and useful Improvements Relating to Carriage-Springs, of which the following is a specification.

The principal object of the invention is to produce a short and light spring, which will give a great amount of elasticity or vibration to the carriage-body, and one that can be easily applied, and will occupy but a small flat space. In narrow light buggies, or other light vehicles, other means have been resorted to—viz., ordinary light springs applied to the body of a wagon at the opposite sides, and crossing each other, in order to get sufficient length to the spring, so that sufficient vibration may be obtained. With my springs I produce the desired effect by folding the metal in such a manner as to produce a much greater vibration than by an ordinary leaf-spring, and it is attached in the same manner to the bottom of a vehicle at any desirable place, one end to the body and the other to the side bar or other suitable place. It enables a short spring to do the work of a long one. The improvement may be applied to heavy wagons and vehicles of nearly every kind; but I deem it more especially desirable for light buggies, and will describe it as so applied. I fold the steel in horizontal bends, holding the several convolutions out of contact each with the other, and in what I esteem the most complete form of the invention, make the convolutions greater as the distance from the supporting-bearing increases. There is a tendency in such springs to concentrate the strain too much in the short bends which are formed. I have devised peculiar means of re-enforcing the bends. The folds or bends may be single or duplex. I prefer the duplex form.

The accompanying drawings form a part of this specification, and represent what I consider the best means of carrying out the invention.

Figure 1 is a rear view showing two of the springs attached to the body of a wagon, and connecting it with longitudinal side bars. (Represented in sections.) Fig. 2 is a side elevation of a spring detached. This figure is on a larger scale. Fig. 3 is a plan view of a spring corresponding to Fig. 2. Fig. $3^a$ is a section on the line $y\ y$ in Fig. 3. Fig. 4 is a cross-section through one of the bends with the re-enforcing means applied. Fig. 5 is a diagram intended to show, somewhat exaggerated, the upset conditions of the spring at the several folds. The remaining figures represent modifications. Fig. 6 is a side elevation, and Fig. 7 a plan view showing a form in which the spring is made in a single part. Fig. 8 is a cross-section on the line $x\ x$ in Fig. 7. Fig. 9 is a side elevation, and Fig. 10 is a cross-section, showing a modification in the means of attaching my single spring to the carriage-body. Fig. 11 is a cross-section, showing a modification in the re-enforcing of the quick bends.

Similar letters of reference indicate corresponding parts in all the figures where they occur.

Referring to Figs. 1, 2, and 3, A is the spring entire, certain portions being designated by additional marks, as A′, $A^2$, &c.

A′ are eyes formed by bending the material around.

$A^2$ are straight parallel portions.

$A^3$ are folds of the two parts extending in opposite directions, each being formed by an extension of the material out at right angles to the general line of the spring to a little distance, then making a quick bend and returning.

$A^4$ are corresponding but longer folds formed in the same manner—that is to say, the material of the two parts of the spring, after being extended out a considerable distance in opposite directions and returning again, make quick bends at the points where they approach each other, and again extend outward, this time to a greater distance than before, and again return. There may be a third pair of folds, or a fourth, if desired, in any case, in each of which the metal is extended out farther than the last; but I esteem two amply sufficient for general purposes. After making one or more excursions the two parts are brought together and extended outward in the general line of the spring, making a small bend sufficient to form proper eyes to receive bolts. What I have termed the "two parts" are formed from one bar of steel connected to the outer end.

B is the body of the buggy or other carriage to which the improvement is applied.

C C are the side bars, encircled by clips which attach them to arms D, which may be more or less elastic, but which are relied upon mainly to serve as levers to communicate the action of the spring properly. Bolts and nuts E E′ secure the levers D rigidly to the outer end, $A^5$, of the spring. Bolts G G secure the eyes A′ of the spring to a substantial portion of the bottom of the body B. Short bolts and nuts H H′ are inserted in the several quick bends, as indicated. Each is equipped with a washer, *h*, which aids to give a broad bearing on the spring. The head of each bolt is also widely extended, so as to give a broad bearing. The spring is accurately faced on both the upper and lower sides by hammering, rolling, or otherwise, so as to preserve all the strength possible in the spring.

In what I esteem the best form of the invention the metal is slightly "upset" at the several points which are to form the bends, so as to afford increased strength to these points. The bolts H, with their broad bearing heads and washers clamping firmly on the springs at the several bends, re-enforce and stiffen the metal at these points. The increased cross-section of the spring given by the upsetting also contributes to this end. By the two means the spring is sufficiently fortified at these points to avoid mischief from the concentration of the strains at these portions.

In the use of the carriage, whether on good roads or over uneven, rocky, or stumpy ground, the shocks are transmitted to the spring through the medium of the side bars C, which are connected to the running-gear in any ordinary or suitable manner (not represented) so as to themselves offer a considerable amount of vertical elasticity. The levers D allow a slight motion of the spring to give a considerable motion to the wagon-body B. The action of the spring is mainly torsional. The parallel portions of the folds $A^3$ $A^4$ each receive the force in a manner tending to twist the material. Torsional strains give nearly equal action to all the particles. Steel is eminently adapted to exert a great resilient force in this manner, and to endure repeated actions. The longer portions contained in the folds $A^4$ yield to a greater extent than the short portions in the folds $A^3$. The folds $A^3$ are subjected to more leverage because the fold $A^4$ is equivalent in its action on the part $A^3$ to a corresponding increase in the length of the lever through which the strain is transmitted to $A^3$. I equalize the action on the folds by making the folds $A^3$ shorter than $A^4$.

The construction of my spring affords the proper amount of lateral motion by the ability of the folds to open and close slightly. Under ordinary conditions the two parts of each fold stand parallel. When the carriage is subjected to a strong lateral force, the parts may yield by the sides of the folds assuming more or less oblique positions; but the narrowness of the folds limits the amount of lateral yielding. The construction of either spring will allow an indefinite amount of extension; but as the two springs coact on the opposite sides of the carriage, any lateral movement of the body relatively to the running-gear, while it tends to open the folds of the one spring, tends to close the folds of the other. The folds are so narrow that only a moderate amount of lateral movement is allowed before the parts of metal touch each other and resist any farther lateral movement.

Figs. 6 and 7 represent a modification in which the spring is formed in a single part. The action is substantially the same in this as in the duplex form of spring described, and the strains on the several parts are very similar. By the vertical action of the springs the straight portions of the several folds are subjected to simple torsional forces. By the lateral motions of the wagon-body the folds are alternately expanded and contracted, closing on one side or the other, and resisting further strain by the contact of adjacent faces against each other when the strain becomes excessive. By the forward and backward motions of the wagon-body the several folds are closed at one end and opened at the other. Their contact at the closed end limits the extent of the motion when it tends to become excessive.

In the modification shown in Figs. 9 and 10 the spring is keyed in a box of malleable cast-iron or other suitable material, which latter is bolted to the wagon-body.

Fig. 11 shows the washer *h* developed into a box which nearly incloses the sides of the spring at the bend.

Further modifications may be made. The forms and proportions may be varied within wide limits. I can employ the mode of attachment shown in Figs. 9 and 10 for connecting the duplex springs in Figs. 3 and 4. To effect this the part $A^5$ of the spring is forged into a parallel tongue and inserted and secured in the box in the same manner as indicated in Figs. 9 and 10.

I claim as my invention—

1. The carriage-spring described, having one or more lateral bends or folds, adapted to serve as herein specified.

2. The carriage-spring described, having parallel, or nearly parallel bends or folds arranged in one or more pairs, and adapted to serve as herein set forth.

3. The carriage-spring described, having convolutions or folds $A^3$ $A^4$ increasing in length from the supporting-point A′ outward, as herein specified.

4. The carriage-spring described, having convolutions $A^3$ $A^4$, with the bends thickened by upsetting, so as to offer a greater cross-section at these points, substantially as herein specified.

5. A carriage-spring having convolutions $A^3A^4$, in combination with re-enforcing clamps H H′, adapted to serve as herein specified.

6. The carriage-spring described, in two parts, having pairs of convolutions $A^3$ extending in opposite directions, and pairs of convolutions $A^4$, of greater length, extending also in opposite directions, combined and arranged to serve substantially as and for the purposes herein specified.

WM. VAN ANDEN.

Witnesses:
CHARLES R. SEARLE,
W. C. DEY.